United States Patent
Lemos

(10) Patent No.: US 7,451,338 B2
(45) Date of Patent: Nov. 11, 2008

(54) CLOCK DOMAIN CROSSING

(75) Inventor: Gregory D. Lemos, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 374 days.

(21) Appl. No.: 11/241,581

(22) Filed: Sep. 30, 2005

(65) Prior Publication Data

US 2007/0079167 A1    Apr. 5, 2007

(51) Int. Cl.
*G06F 1/01*    (2006.01)

(52) U.S. Cl. .................. 713/400; 713/401; 713/500; 713/501; 713/502; 713/503; 713/600; 713/601; 370/503; 327/144; 327/145

(58) Field of Classification Search ......... 713/400–401, 713/500–503, 600–601; 370/503; 327/144, 327/145
See application file for complete search history.

(56) References Cited

U.S. PATENT DOCUMENTS

| | | | | |
|---|---|---|---|---|
| 5,915,107 A | * | 6/1999 | Maley et al. | 713/400 |
| 6,009,107 A | * | 12/1999 | Arvidsson et al. | 370/535 |
| 6,049,887 A | * | 4/2000 | Khandekar et al. | 713/503 |
| 6,311,285 B1 | * | 10/2001 | Rodriguez et al. | 713/401 |

* cited by examiner

*Primary Examiner*—Abdelmoniem Elamin
(74) *Attorney, Agent, or Firm*—Konrad Raynes & Victor LLP

(57) ABSTRACT

Provided are a method, system, and device to effectuate a transfer of data from one clock domain to another. In accordance with one aspect of the description provided herein, bits of data to be transferred are shifted in the first clock domain. The shifted bits of data to be transferred may be sampled in a second clock domain at a fixed time within each clock signal of the first clock domain. A stream of sampled bits may be output in the second clock domain. Additional embodiments are described and claimed.

29 Claims, 6 Drawing Sheets

CLOCK DOMAIN CROSSING

BACKGROUND

Digital circuits such as microprocessors, memory circuits, busses and other devices are frequently synchronous circuits in which operations may be synchronized by one or more clock signals. A clock signal is typically a periodic signal having a particular frequency. FIG. 1 shows an example of a known device 10 having logic circuitry 12 which is synchronized by a clock signal A. The device 10 may also have additional logic circuitry 14 which is synchronized by a clock signal B which may be at a different frequency than that of clock signal A. Thus, the logic circuitry 12, 14 can be said to operate in different clock domains, here, clock A domain and clock B domain, respectively.

A device such as device 10 may have separate clock domains for a variety reasons. For example, if the device 10 is part of a portable, battery operated device, the clock signal A may have a frequency substantially lower than that of clock signal B. Hence, logic circuitry 12 may, in some applications, be operated at a reduced power level as compared to logic circuitry 14, to extend effective battery time.

The circuitry of the various clock domains of a device often do not operate completely independently of the operations of the other clock domains. Thus, data may be transferred from one clock domain to another clock domain. The device 10 has a register 16 which may be loaded with data for transfer to the clock B domain. FIGS. 2a and 2b are timing diagrams illustrating a sequence of data words, Word0, Word1, ... Wordn loaded into the register 16. In that the register 16 is in the clock A domain, the register 16 is clocked by the clock signal A. In this example, each data word is available for a full period of clock signal A as shown in FIGS. 2a, 2b.

A data word provided by the register 16 of the clock A domain may be loaded by a register 18 of the clock B domain. In that the register 18 is in the clock B domain, the register 18 is clocked by the clock signal B. In the example of FIG. 2a, the clock signal B has exactly twice the frequency of clock signal A. Thus, the period of the clock signal A is an integral multiple of (here two times) the period of the clock signal B. Accordingly, if the register 18 is triggered to load data from the register 16 on the leading edge 20, for example, of the clock signal B, a data word may be loaded from the register 16 on the leading edge of each clock signal A, as indicated by dashed lines 22 in FIG. 2a. Alternatively, if the register 18 is triggered to load data from the register 16 on the leading edge 24, for example, of the clock signal B, a data word may be loaded from the register 16 on the trailing edge of each clock signal A as indicated by dashed lines 26 in FIG. 2a.

FIG. 2b shows another example in which the period of the clock signal A is not an integral multiple of the period of the clock signal B. In this example, the period of the clock signal A is ⅔ that of the clock signal B. If the register 18 is triggered to load data from the register 16 on the leading edges 20, 24 for example, of the clock signal B, it is seen that the point within the clock signal A at which the data word is loaded into the register 18, shifts from pulse to pulse as indicated by the series of dashed lines 30a, 30b . . . 30n. Eventually, the cycle repeats such that at dashed line 30n, the point within the clock signal A at which the data word is loaded into the register 18 is the same as that of the dashed line 30a. In this example, the cycle is fifteen times the period of the clock B.

DETAILED DESCRIPTION

In the following description, reference is made to the accompanying drawings which form a part hereof and which illustrate several embodiments. It is understood that other embodiments may be utilized and structural and operational changes may be made without departing from the scope of the descriptions provided.

Figure 1:
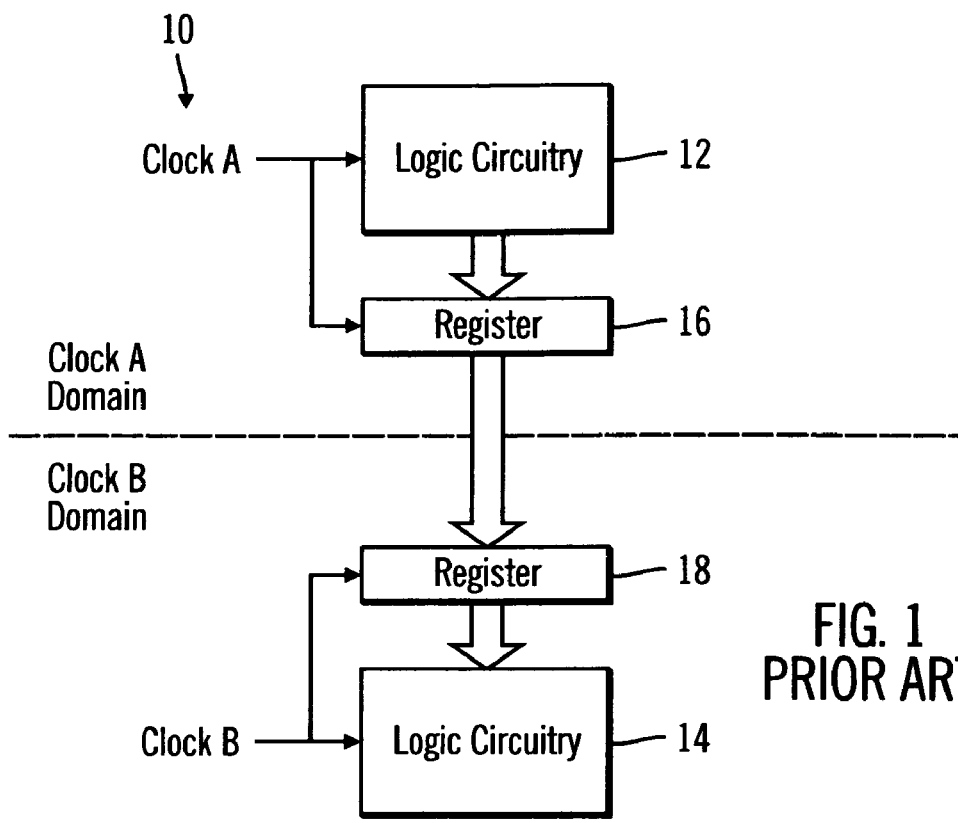
FIG. 1 is a prior art example of a clock domain crossing circuit.
Figure 2A:
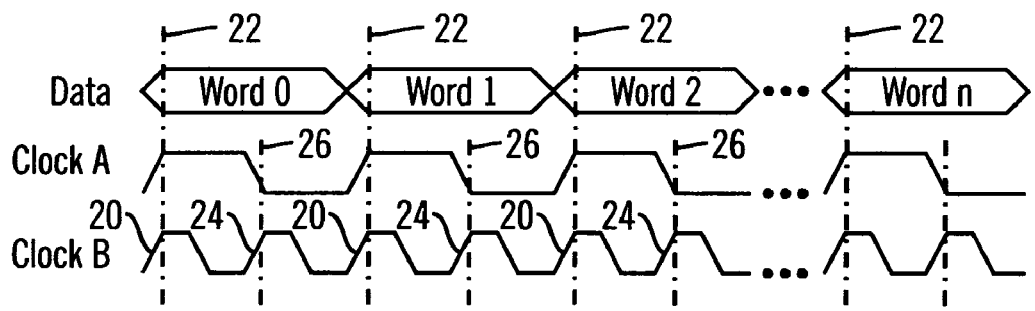
FIGS. 2a and 2b are timing diagrams illustrating operation of a prior art clock domain crossing circuit at various frequencies.
Figure 2B:
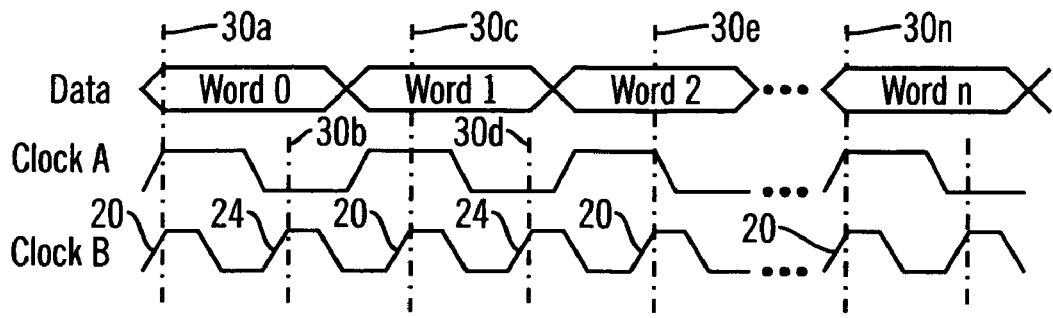
Figure 3:
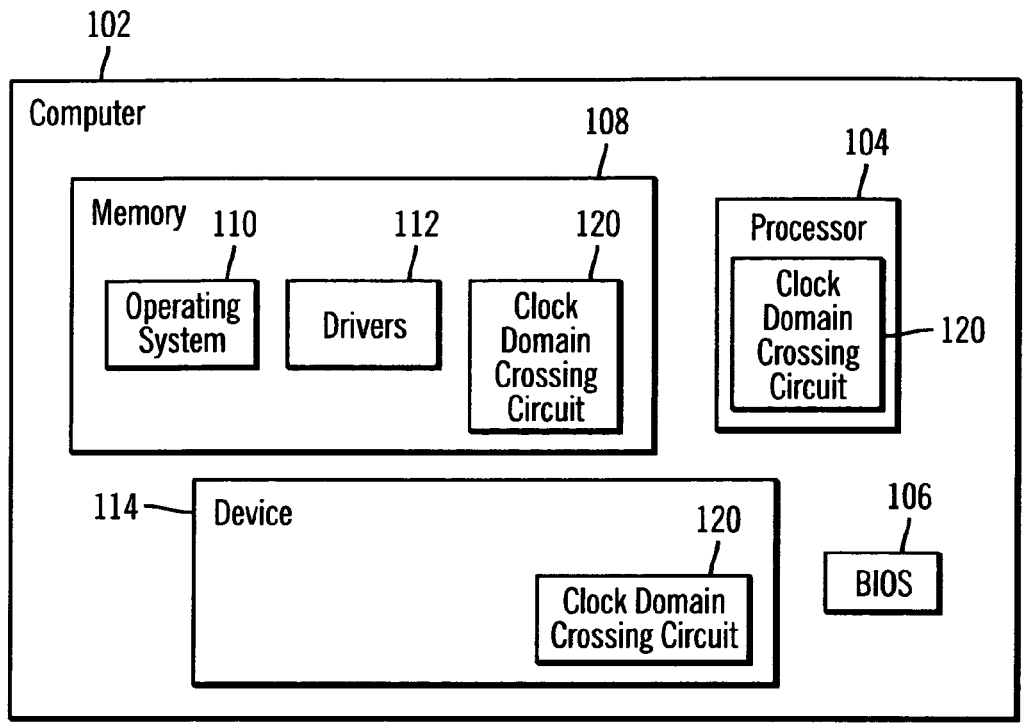
FIG. 3 is a schematic diagram illustrating one environment which may utilize a clock domain crossing circuit in accordance with one embodiment of the description provided herein.

FIG. 3 illustrates one example of a computing environment which may be used with the described embodiments. A computer 102 includes a processor 104 (such as one or more central processing units (CPU)), a basic input/output system (BIOS) 106 including code executed by the processor 104 to initialize and control various computer 102 components (e.g., the keyboard, display screen, disk drives, serial communications, etc.) during a boot sequence. The computer 102 includes a memory 108, comprising one or more volatile memory devices, such as volatile random access memory (RAM), in which an operating system 110 and one or more drivers 112, such as a device driver interfacing with an attached device 114, are loaded into the memory 108 implementing a runtime environment. In some applications, the memory 8 may further include nonvolatile memory (e.g., a flash memory, Electronically Erasable Programmable Memory (EEPROM), optical disk drives, magnetic disk drives etc.)

The device 114 may comprise any type of Input/Output (I/O) device internal or external to a housing of the computer 102, such as a hard disk drive, or a video chipset, which may be integrated on the computer 102 motherboard or on an expansion card inserted in an expansion slot on the computer 102 motherboard. The BIOS 106 may be implemented in firmware in a non-volatile memory device on the computer 102 motherboard, such as a Flash memory, Read Only Memory (ROM), Programmable ROM (PROM), etc. The BIOS 106 code indicates the sequence of the boot operations. The operating system 110 may comprise a suitable operating system, such as a Microsoft® Windows® operating system, Linux™, Apple® Macintosh®, etc. (Microsoft and Windows are registered trademarks of Microsoft Corporation, Apple and Macintosh are registered trademarks of Apple Computer, Inc., and Linux is a trademark of Linus Torvalds). The computer 102 may comprise any computing device known in the art, such as a mainframe, server, personal computer, workstation, laptop, handheld computer, telephony device, network appliance, virtualization device, storage controller, network controller, etc. Any suitable CPU or processor 104 and operating system may be used.

In accordance with one aspect of the description provided herein, one or more of the devices of a system such as the computer 102 may include a clock domain crossing circuit 120 to facilitate transferring data from one clock domain to another. For example, the memory 108 may include a clock domain crossing circuit 120 within the memory 108 to facilitate transferring data from one clock domain to another clock domain within the memory 108. The clock domain crossing circuit 120 may be implemented on a dynamic random access memory (DRAM) monolithic integrated circuit chip, for example. The processor 104 may similarly have a clock domain crossing circuit 120 to facilitate the transfer of data from one clock domain of the processor 104 to another clock domain within the processor 104. The clock domain crossing circuit 120 of the processor 104 may be implemented on a microprocessor monolithic integrated circuit chip, for example. Similarly, the device 114 may have a clock domain crossing circuit 120 to facilitate the transfer of data from one clock domain of the device 114 to another clock domain within the device 114. The clock domain crossing circuit 120 of the device 114 may be implemented on an integrated circuit chip, for example. It is appreciated that a system may have as few as one and as many as several such clock domain crossing circuits. The clock domain crossing circuit 120 may be implemented on a single monolithic integrated circuit chip, or may span a plurality of monolithic integrated circuit chips.

Figure 4:
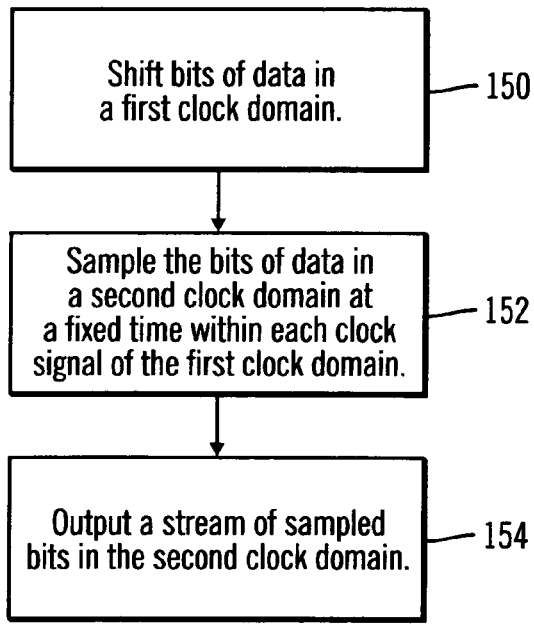
FIG. 4 illustrates one example of operations of a clock domain crossing circuit in accordance with one embodiment of the description provided herein.
Figure 5:
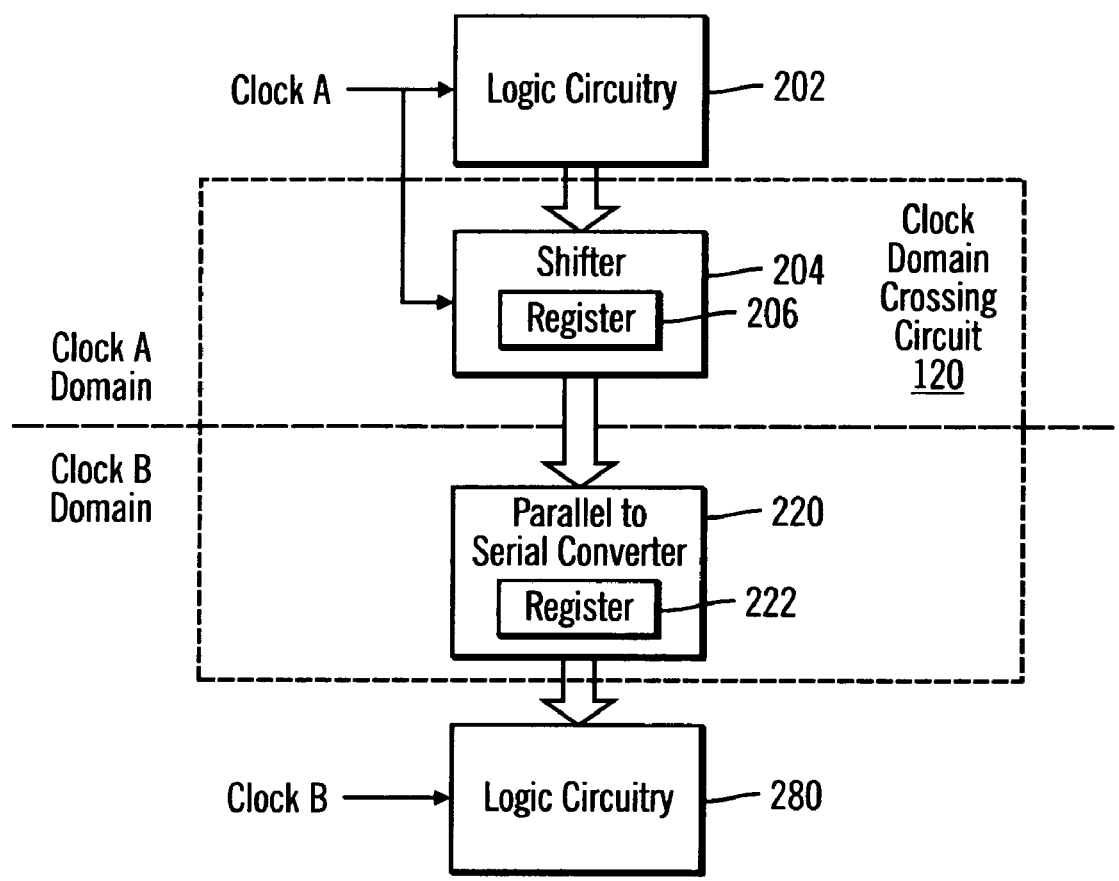
FIG. 5 is a schematic diagram of a clock domain crossing circuit in accordance with one embodiment of the description provided herein.

FIG. 4 illustrates one example of operations to effectuate a transfer of data from one clock domain to another, in accordance with one aspect of the description provided herein. In one operation, bits of data to be transferred are shifted (block 150, FIG. 4) in the first clock domain. FIG. 5 shows an example of a clock domain crossing circuit 120 which shifts bits of data to be transferred to another clock domain.

In another operation, shifted bits of data to be transferred may be sampled (block 152, FIG. 4) in a second clock domain at a fixed time within each clock signal of the first clock domain. FIGS. 5-8 show one example in which shifted bits of data to be transferred may be sampled in a second clock domain at a fixed time within each clock signal of the first clock domain.

In another operation, a stream of sampled bits may be output (block 154, FIG. 4)) in the second clock domain. FIGS. 5-8 show one example in which a stream of sampled bits may be output in a second clock domain.

Figure 6:
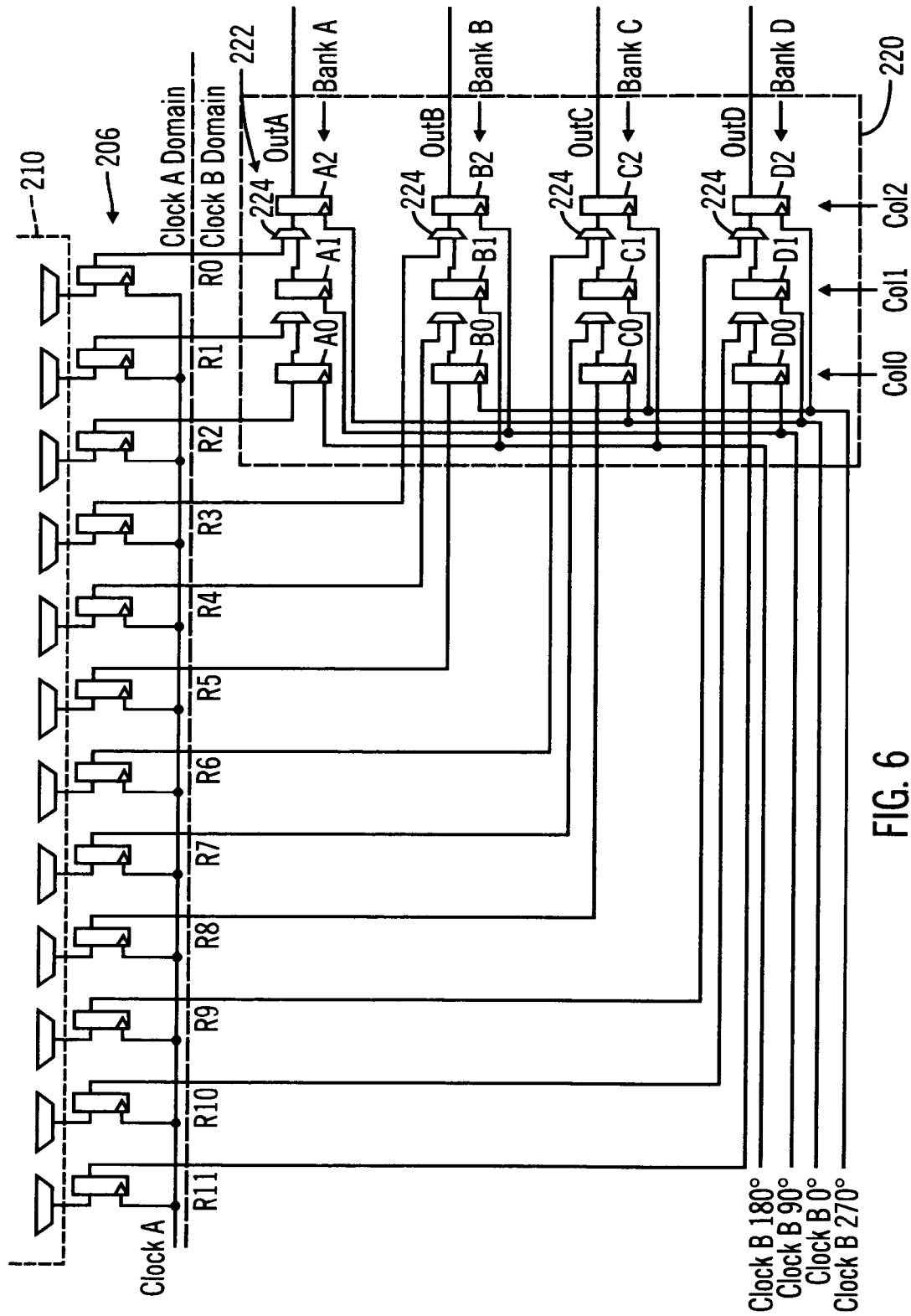
FIG. 6 is a more detailed schematic diagram of a portion of the clock domain crossing circuit of FIG. 5.

Referring to FIG. 5, data to be transferred from a first clock domain, designated clock A domain in this example, to a second clock domain, designated clock B domain, in this example, is provided by a logic circuit 202 which is clocked by clock A of the clock A domain. Bits of data to be transferred are shifted by a shifter circuit 204 and stored in a register 206. FIG. 6 shows an example of a register 206 which includes 12 flip-flops having 12 outputs, R0, R1, . . . R11, respectively. It is appreciated that the register 206 may be formed of a variety of temporary storage devices and may include more or fewer bit positions, depending upon the particular application.

In this embodiment, each word of data to be transferred includes 9 bits, bits 0, 1, 2 . . . 8. These bits are shifted and loaded, together with three don't care bits (each designated "X") in the flip-flops of the register 206. The outputs of the 12 flip-flops of the register 206 are designed R0, R1, R2 . . . R11. Table 1 below indicates one example in which bits of a data word to be transferred may be shifted by the shifter 204 and loaded into the register 206. It is appreciated that the manner in which transfer bits are shifted may vary, depending upon the particular application.

TABLE 1

| Clock A cycle: | Data bit shifting in Clock A Domain | | | | | | | | | | | |
|---|---|---|---|---|---|---|---|---|---|---|---|---|
| | Shifter Register Outputs: | | | | | | | | | | | |
| | R11 | R10 | R9 | R8 | R7 | R6 | R5 | R4 | R3 | R2 | R1 | R0 |
| Clock A Cycle 0 | 7 | 3 | X | 6 | X | 2 | X | 5 | 1 | 8 | 4 | 0 |
| Clock A Cycle 1 | 6 | X | 2 | X | 5 | 1 | 8 | 4 | 0 | 7 | 3 | X |
| Clock A Cycle 2 | X | 5 | 1 | 8 | 4 | 0 | 7 | 3 | X | 6 | X | 2 |
| Clock A Cycle 3 | 8 | 4 | 0 | 7 | 3 | X | 6 | X | 2 | X | 5 | 1 |

In this example, a new word to be transferred is presented each cycle of clock A of the clock A domain. In Table 1, four successive clock A cycles are designated clock A cycle 0, clock A cycle 1, clock A cycle 2 and clock A cycle 3. Thus, as shown in Table 1 below, the shifter 204 shifts bit 7 of the transfer word of clock A cycle 0 and loads it in the R11 output of the register 206. The shifter 204 shifts bit 3 of the transfer word of clock A cycle 0 and loads it in the R10 output of the register 206 and so on as indicated in Table 1. Don't cares (designated "X") are loaded in the R9, R7 and R5 outputs for the transfer word of the clock A cycle 0.

In the illustrated embodiment, the shifting function is performed by a barrel shifter 210 (FIG. 6) of the shifter circuit 204 (FIG. 5). It is appreciated that a variety of techniques and devices may be used to perform the bit shifting function. These include dedicated hardwired circuits, firmware, software, general purpose processors, ASICs, etc. Shifting techniques other than barrel shifting may be utilized as well, depending upon the particular application. Furthermore, the data bit shifting indicated by Table 1 provides but one example of suitable bit shifting in accordance with the present description. It is appreciated that other bit shifting schemes may be utilized, depending upon the particular application.

Figure 7:
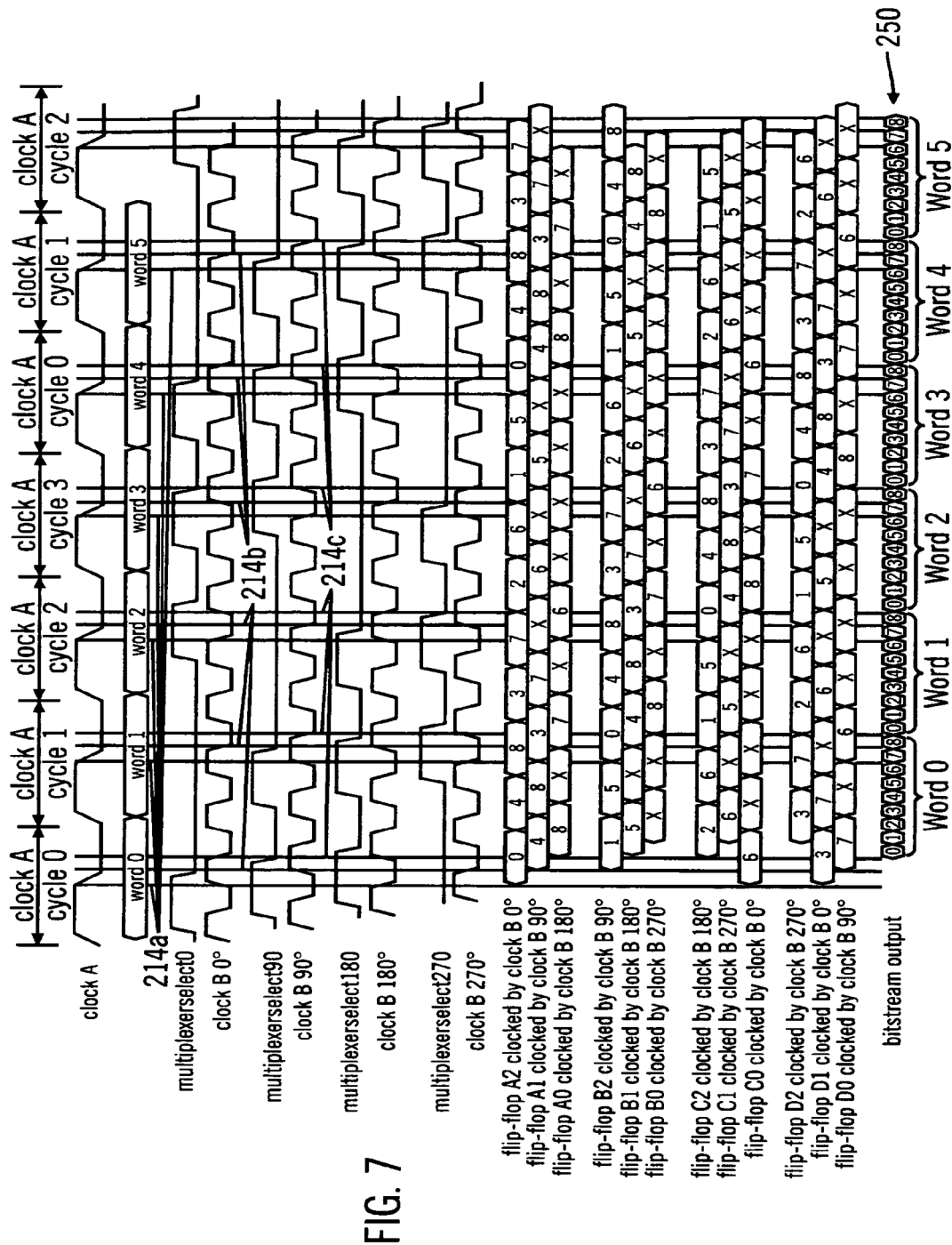
FIG. 7 is a timing diagram illustrating operation of one embodiment of the parallel to serial converter circuit of FIG. 6.

As previously mentioned, bits of data to be transferred may be sampled (block 152, FIG. 4) in a second clock domain at a fixed time within each clock signal of the first clock domain. FIG. 7 shows one example of sampling bits of data to be transferred at a fixed time within each clock signal of the first clock domain, that is, clock domain A, in this example. As shown in FIG. 7, bits are sampled at three fixed times within each cycle of clock A, as indicated by three vertical lines 214a, 214b, 214c. Thus, during clock A cycle 0, the bits of word 0 are sampled at the same three times 214a, 214b, 214c within clock cycle 0 that bits are sampled from word 1 during clock A cycle 1 and so on.

In this example, the clock signal A has a period of 9 unit intervals (UI) and the clock signal B has a period of 4 unit intervals. Thus, the period of the clock A is 9/4 times that of the period of the clock B and the period of the clock B is 4/9 times that of the clock A. It is believed that the clock domain crossing features described herein are applicable to a variety of different clocks including those in which neither period is an integral multiple of the other period such as those shown in FIG. 7, for example. Thus, it is appreciated that the relative lengths of the clock signals may vary, depending upon the particular application.

FIG. 5 shows one example of a circuit for sampling bits of data in the second clock domain of clock B at a fixed time within each clock signal of the first clock domain of clock A. In this embodiment, the sampling circuit includes a parallel to serial converter 220 which is clocked by clock B of the clock B domain. The bits of data sampled from the register 206 are stored in a register 222. FIG. 6 shows an example of a register 222 which includes 12 flip-flops designated A0, A1, A2, B0, B1, B2, C0, C1, C2, D0, D1, D2, respectively. It is appreciated that the register 222 may be formed of a variety of temporary storage devices and may include more or fewer bit positions, depending upon the particular application.

Table 2 below indicates one example of the manner in which data bits of the data words being transferred may be sampled and stored in the register 222.

TABLE 2

Data bit mapping to converter register in Clock B Domain

| Clock A cycle: | Bank D | | | Bank C | | | Bank B | | | Bank A | | |
|---|---|---|---|---|---|---|---|---|---|---|---|---|
| | D0 | D1 | D2 | C0 | C1 | C2 | B0 | B1 | B2 | A0 | A1 | A2 |
| 0 | 7 | 3 | X | 6 | X | 2 | X | 5 | 1 | 8 | 4 | 0 |
| 1 | 6 | X | 2 | X | 5 | 1 | 8 | 4 | 0 | 7 | 3 | X |
| 2 | X | 5 | 1 | 8 | 4 | 0 | 7 | 3 | X | 6 | X | 2 |
| 3 | 8 | 4 | 0 | 7 | 3 | X | 6 | X | 2 | X | 5 | 1 |

In the illustrated embodiment, the flip-flops designated A0, A1, A2, B0, B1, B2, C0, C1, C2, D0, D1, D2, of the register 222 are logically arranged in a four by three array of four banks A, B, C and D, each of which having three flip-flops in three columns, col1, col2, col3. Thus, as shown in FIG. 6 and Table 2, Bank A has flip-flops A0, A1, A2, Bank B has flip-flops B0, B1, B2, and so on.

As previously mentioned, in this example, a new word to be transferred is presented each cycle of clock A of the clock A domain. Thus, in both Table 1 and Table 2, four successive clock A cycles are designated clock A cycle 0, clock A cycle 1, clock A cycle 2 and clock A cycle 3. As previously mentioned and shown in Table 1 above, the shifter 204 shifts bit 7 of the transfer word of clock A cycle 0 and loads it in the R11 output of the register 206. As shown in FIG. 6, the flip-flop D0 of the register 222 has an input coupled to the R11 output of the register 206. Accordingly, as shown in Table 2, the flip-flop D0 of the Bank D loads the bit 7 of the transfer word of clock A cycle 0. The parallel to serial converter 220 includes an input multiplexer 224 having an input coupled to the R10 output of the register 206 and an output coupled to the input of the flip-flop D1 of the Bank D. The flip-flop D1 of the Bank D loads bit 3 of the transfer word of clock A cycle 0 as indicated in Table 2. The remaining flip-flops of the register 222 are coupled to corresponding outputs of the register 206 and load shifted bits as set forth in the Tables 1 and 2.

As previously mentioned, a stream of sampled bits is outputted (block 154. FIG. 4) in the second clock domain. FIG. 7 shows one example of outputting a stream 250 of sampled bits in the clock B domain. The stream 250 is outputted by the register 222 of the parallel to serial converter 220. The stream 250 comprises bits 0, 1, . . . 8 of sampled word 0, bits 0, 1, . . . 8 of sampled word 1, and so on. It is appreciated that the order of the bits, and the number of bits may vary, depending upon the particular application.

In this embodiment, the parallel to serial converter 220 samples bits of data in the second clock domain of clock B at a fixed time within each clock signal of the first clock domain of clock A. As explained in greater detail below, to output the stream 250 of bits, some bits may be output by the converter 220 after being loaded by the register 222. Other bits are first shifted within the register 222 before being outputted by the register 222.

As previously mentioned, the input of the flip-flop D1 of the Bank D is coupled to an input multiplexer 224 having an input coupled to the R10 output of the register 206. The input multiplexer 224 has another input coupled to the output of the flip-flop D0 as shown in FIG. 6. Thus, either the R10 output of the register 206 can be loaded into the flip-flop D1, or the output of the flip-flop D0 may be shifted into the flip-flop D1, depending upon the selection of the multiplexer 224. Bits may be loaded into or shifted into the remaining flip-flops of the register 222 using a multiplexer 224 as shown in FIG. 6.

Figure 8:
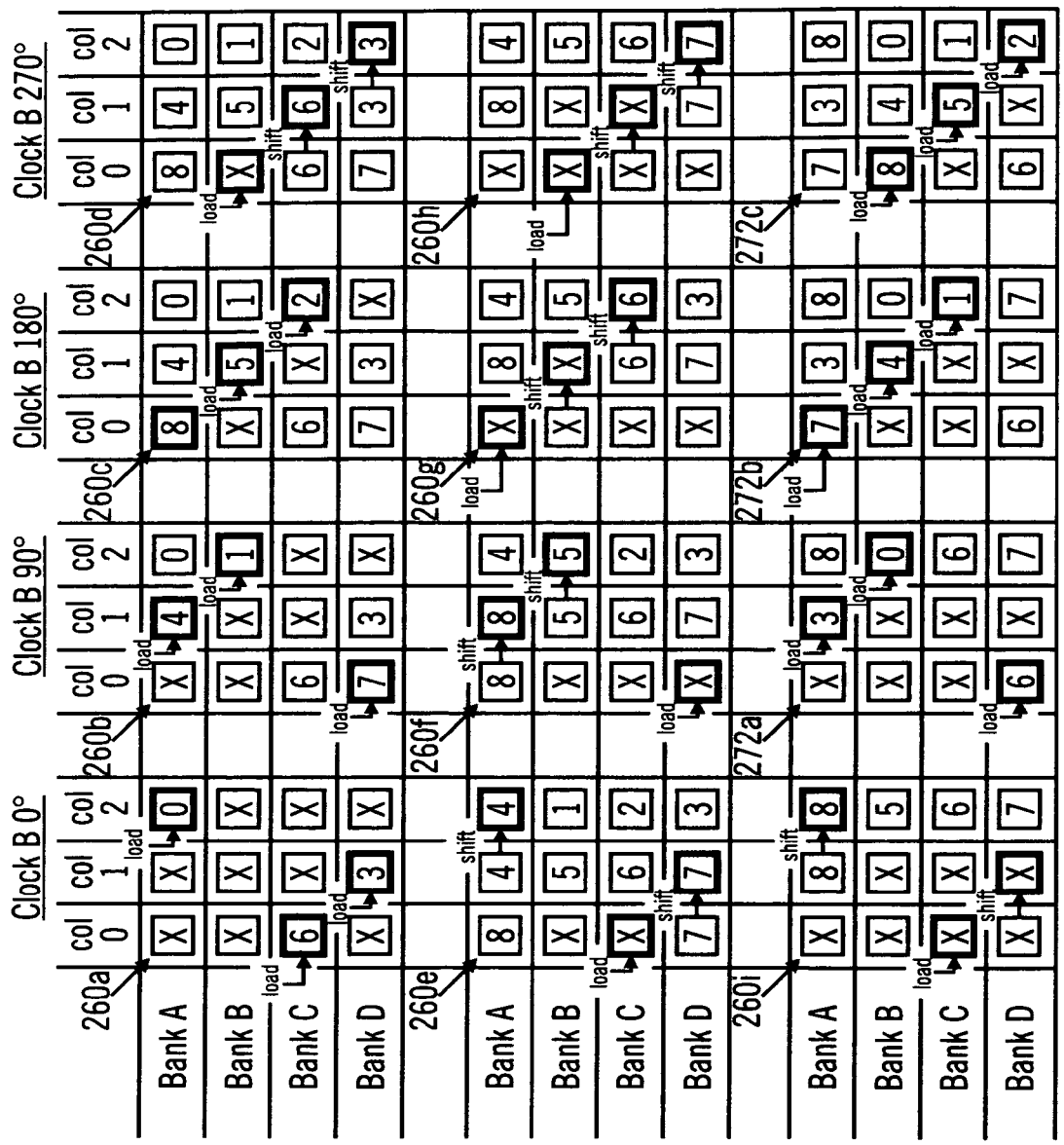
FIG. 8 is a chart illustrating operation of one embodiment of the parallel to serial converter circuit of FIG. 6.

FIG. 8 is a chart illustrating one example of a timing sequence by which bits of a word may be sampled and selectively shifted to produce the stream 250. It is appreciated that other timing sequences may be utilized, depending upon the particular application. In the chart of FIG. 8, the four by three array of flip-flops of the register 222 are represented by a four by three array of boxes 260a having four rows of boxes labeled Bank A, Bank B, Bank C, Bank D, in three columns of boxes labeled col0, col1, col2 in the same manner as the flip-flops A0, A1 . . . D2 of FIG. 6. Thus, the flip-flop D1, for example, is represented in the array 260a of FIG. 8 by the box in the row labeled Bank D and in the column labeled col1.

In the illustrated embodiment, and as shown in FIG. 6, the flip-flops A0, A1, A2, B0, B1, B2, C0, C1, C2, D0, D1, D2, of the register 222 are clocked by four phases of the clock B, designated clock B 0°, clock B 90°, clock B 180°clock B 270°which are depicted in FIG. 7. Thus, for example, the flip-flop D0 is clocked by the clock B 90°, the flip-flop D1 is clocked by the clock B 0°, and so on as shown in FIGS. 6 and 7.

The four by three array 260a of boxes of the chart of FIG. 8 illustrates the loading of bits during the clock B 0°. As indicated in Table 2, during clock A cycle 0, the flip-flop C0 (Bank C, col0) loads the bit 6, which is bit 6 of word0 as indicated in FIG. 7. The loading of bit 6 by flip-flop C0 is indicated by the box in row BankC, column col0 in array 260a of FIG. 8. In addition, flip-flops D1 and A2 load bits 3, 0, respectively during clock A cycle 0 as indicated in Table 2 and FIG. 8.

The chart of FIG. 8 comprises a plurality of arrays 260a, 260b . . . 260i similar to the array 260a. The arrays 260a, 260b . . . 260i when read in time sequential order corresponding to the timing diagram of FIG. 7, are read left to right, top to bottom. The next four by three array 260b of boxes of the chart of FIG. 8 illustrates the loading of bits during the clock B 90°. As indicated in Table 2 and FIGS. 7, 8, during clock A cycle 0, the flip-flops D0, A1, B2 load the bits 7, 4, 1, respectively of word 0. The next four by three array 260c of boxes of the chart of FIG. 8 illustrates the loading of bits during the clock B 180°. As indicated in Table 2 and FIGS. 7, 8, during clock A cycle 0, the flip-flops A0, B1, C2 load the bits 8, 5, 2, respectively, of word 0.

At this point, all 9 bits 0, 1, . . . 8 of word 0 have been loaded into flip-flops of the register 222. In the illustrated embodiment, outputs of the column col2 flip-flops, that is flip-flops A2, B2, C2, D2, may be selected for output to the bit stream 250. In this example, after being loaded by the flip-flops A2, B2, C2, bits 0, 1, 2, respectively, of word 0 are available for output on outputs outA, outB, outC (FIG. 6) of the flip-flops A2, B2, C2, respectively.

The next four by three array 260d of boxes of the chart of FIG. 8 illustrates the shifting of bits during the clock B 270°. As indicated in FIGS. 7, 8, during clock A cycle 0, the bits 6, 3 loaded by flip-flops C0, D1, respectively, are shifted to flip-flops C1, D2, respectively. Hence, the bit 3 of word 0 is available for output on output outD of flip-flop D2. The flip-flop B0 loads a don't care (as indicated by the "X") in Table 2 and FIGS. 7, 8, during the clock B 270°.

The next four by three array 260e of boxes of the chart of FIG. 8 illustrates the shifting of bits during the clock B 0°. As indicated in FIGS. 7, 8, during clock A cycle 0, the bits 7, 4 loaded by flip-flops D0, A1, respectively, are shifted to flip-flops D1, A2, respectively. Hence, the bit 4 of word 0 is available for output on output outA of flip-flop A2. The flip-flop C0 loads a don't care (as indicated by the "X") in Table 2 and FIGS. 7, 8, during the clock B 0°.

It is noted that in the clock B 0°, as represented by the four by three array 260a of boxes of the chart of FIG. 8, the flip-flops D1, A2 loaded bits of word 0. In the next clock B 0°, as represented by the four by three array 260e of boxes of the chart of FIG. 8, the flip-flops D1, A2 received shifted bits of word 0. The multiplexers 224 coupled to the inputs of the flip-flops D1, A2 are controlled in the illustrated embodiment by a multiplexer select signal multiplexselect0 which is depicted in FIG. 7. The multiplexer select signal multiplexerselect0 controls the input multiplexer 224 of the flip-flops which are clocked by the clock signal clock B 0°. Similarly, the multiplexer select signal multiplexerselect90 controls the input multiplexers 224 of the flip-flops which are clocked by the clock signal clock B 90°. The multiplexer select signal multiplexerselect180 controls the input multiplexers 224 of the flip-flops which are clocked by the clock signal clock B 180°. The multiplexer select signal multiplexerselect270 controls the input multiplexers 224 of the flip-flops which are clocked by the clock signal clock B 270°.

In the remaining four by three array 260f, 260g, 260h, 260i, the flip flops of the columns col1, col2 shift bits of word 0 when clocked by the associated clock clock B 0°, clock B 90°, clock B 180°, or clock B 270°, and the flip-flops of the column col0 load don't cares. In the illustrated embodiment, outputs of the column col2 flip-flops A2, B2, C2, D2 may be selected to output the remaining bits 4, 5, . . . 8 for output to the bit stream 250 as shown in FIG. 7.

The above described cycle of operations is repeated for each successive word 1, word 2, word 3 . . . provided in each successive clock A cycle 1, cycle 2, cycle 3 . . . , respectively. Thus, for example, the four by three array 272a of boxes of the chart of FIG. 8 illustrates the loading of bits during the clock B 90° and clock A cycle 1. The four by three array 272b of boxes of the chart of FIG. 8 illustrates the loading of bits during the clock B 180° and clock A cycle 1. The four by three array 272c of boxes of the chart of FIG. 8 illustrates the loading of bits during the clock B 270° and clock A cycle 1. The remaining portion of the chart of FIG. 8 for the clock A cycle 1, cycle 2, cycle 3 may be readily determined by reference to Tables 1, 2 and FIGS. 6, 7.

The stream 250 sequence of data words, Word0, Word1, . . . Wordn, which is clocked by clock B of the Clock B Domain, may be utilized and processed by other logic of the Clock B Domain as represented by the logic circuitry 280 which is also clocked by the clock B. Circuitry similar to the clock domain crossing circuit 120 may be employed to transfer data words from the Clock B Domain over to the Clock A Domain.

ADDITIONAL EMBODIMENT DETAILS

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention. Further, although process operations, method operations, algorithms or the like may be described in a sequential order, such processes, methods and algorithms may be configured to work in alternate orders. In other words, any sequence or order of operations that may be described does not necessarily indicate a requirement that the operations be performed in that order. The operations of processes described herein may be performed in any order practical. Further, some operations may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article. The functionality and/or the features of a device may be alternatively embodied by one or more other devices which are not explicitly described as having such functionality/features. Thus, other embodiments of the present invention need not include the device itself.

The described operations may be implemented as a method, apparatus or article of manufacture using standard programming and/or engineering techniques to produce software, firmware, hardware, or any combination thereof. The term "article of manufacture" as used herein refers to code or logic implemented in a tangible medium, where such tangible medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The tangible medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present description, and that the article of manufacture may comprise any suitable information bearing medium.

In certain implementations, the embodiments may be included in a computer system including nonvolatile memory and a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative implementations, embodiments may be included in a system that does not include nonvolatile memory or a storage controller, such as certain hubs and switches.

In certain implementations, the embodiments may be implemented in a computer system including a video controller to render information to display on a monitor electrically coupled to the computer system including the host software driver and network controller, such as a computer system comprising a desktop, workstation, server, mainframe, laptop, handheld computer, telephone, etc. Alternatively, the features described herein may be implemented in a computing device that does not include a video controller, such as a switch, router, etc.

The devices 114 of the architecture of the system 102 may include a network controller to enable communication with a network, such as an Ethernet, a Fibre Channel Arbitrated Loop, etc. Further, the architecture may, in certain embodiments, include a video controller to render information on a display monitor, where the video controller may be implemented on a video card or integrated on integrated circuit components mounted on the motherboard.

An input device may be used to provide user input to the processor 104, and may include a keyboard, mouse, pen-stylus, microphone, touch sensitive display screen, or any other suitable activation or input mechanism. An output device may be capable of rendering information transmitted from the processor 104, or other component, such as a display monitor, printer, storage, etc.

The embodiments of the present description may be implemented on an expansion card such as a network card, such as a Peripheral Component Interconnect (PCI) card or some other card, or on integrated circuit components mounted on the motherboard.

The foregoing description of various embodiments has been presented for the purposes of illustration. It is not intended to be exhaustive or to limit to the precise form disclosed. Many modifications and variations are possible in light of the above teaching.

What is claimed is:

1. A method, comprising:
providing data in a first clock domain in which clock signals have a first period; and
sampling said data in a second clock domain in which clock signals have a second period in which neither said first period nor said second period is an integral multiple of the other period and wherein said sampling occurs at multiple fixed times within each clock signal of said first period.

2. The method of claim 1 further comprising outputting a stream of sampled bits in said second clock domain.

3. The method of claim 2 wherein said sampling includes loading parallel bits of said data from said first clock domain in a parallel to serial converter, and clocking said parallel to serial converter using clock signals of said second clock domain.

4. The method of claim 3 wherein said stream outputting includes converting said parallel bits to serial bits using said parallel to serial converter.

5. The method of claim 4 wherein said data providing includes shifting bits of said data using a barrel shifter, clocking said barrel shifter using clocks signals of said first clock domain, and loading said shifted data bits into selected bit positions of a register and clocking said register using clock signals of said first clock domain.

6. The method of claim 5 wherein said parallel bit loading includes loading bits of data from said register into a plurality of flip-flops of said parallel to serial converter, clocking said flip-flops using clock signals of said second clock domain, each flip-flop of said converter having an input coupled to an associated bit position of said register of said first clock domain.

7. The method of claim 6 wherein said converter flip-flops are configured into a plurality of banks, each bank comprising a plurality of said converter flip-flops, said converter flip-flop clocking including clocking each converter flip-flop of each bank being clocked using a clock signal of a phase different from the phase of the clock signals for the other converter flip-flops of a particular bank of converter flip-flops.

8. The method of claim 7 wherein said converting said parallel bits to serial bits comprises shifting a loaded bit from one converter flip-flop of a bank to another converter flip-flop of the same bank.

9. A device, comprising:
an integrated circuit having a first clock domain in which clock signals have a first period and a second clock domain in which clock signals have a second period in which neither said first period nor said second period is an integral multiple of the other period;
wherein said first clock domain has a first logic circuit adapted to provide data and said second clock domain has a second logic circuit adapted to sample said data at multiple fixed times within each clock signal of said first period.

10. The device of claim 9 wherein said second logic circuit is further adapted to output a stream of sampled bits in said second clock domain.

11. The device of claim 10 wherein said second logic circuit includes a parallel to serial converter adapted to load parallel bits of said data from said first clock domain in response to clock signals of said second clock domain.

12. The device of claim 11 wherein said parallel to serial converter is further adapted to convert said parallel bits to serial bits.

13. The device of claim 12 wherein said first logic circuit includes a register and a barrel shifter wherein said barrel shifter is adapted to shift bits of said data in response to clocks signals of said first clock domain, and load said shifted data bits into selected bit positions of said register in response to clock signals of said first clock domain.

14. The device of claim 13 wherein said parallel to serial converter includes a plurality of flip-flops, each flip-flop of said converter having an input coupled to an associated bit position of said register of said first clock domain and wherein said parallel to serial converter is further adapted to load bits of data from said register into said plurality of flip-flops in response to clock signals of said second clock domain.

15. The device of claim 14 wherein said converter flip-flops are configured into a plurality of banks, each bank comprising a plurality of said converter flip-flops, and wherein each converter flip-flop of each bank stores an input bit in response to a clock signal of a phase different from the phase of the clock signals for the other converter flip-flops of a particular bank of converter flip-flops.

16. The device of claim 15 wherein said parallel to serial converter is further adapted to shift a loaded bit from one converter flip-flop of a bank to another converter flip-flop of the same bank.

17. The device of claim 9 wherein said integrated circuit is a monolithic integrated circuit memory chip.

18. A system, comprising:
a processor;
memory electrically coupled to said processor;
a video processor electrically coupled to said processor; and
an integrated circuit disposed on one of said processor, memory, video processor, and having a first clock domain in which clock signals have a first period and a second clock domain in which clock signals have a second period in which neither said first period nor said second period is an integral multiple of the other period;
wherein said first clock domain has a first logic circuit adapted to provide data and said second clock domain has a second logic circuit adapted to sample said data at multiple fixed times within each clock signal of said first period.

19. The system of claim 18 wherein said second logic circuit is further adapted to output a stream of sampled bits in said second clock domain.

20. The system of claim 19 wherein said second logic circuit includes a parallel to serial converter adapted to load parallel bits of said data from said first clock domain in response to clock signals of said second clock domain.

21. The system of claim 20 wherein said parallel to serial converter is further adapted to convert said parallel bits to serial bits.

22. The system of claim 21 wherein said first logic circuit includes a register and a barrel shifter wherein said barrel shifter is adapted to shift bits of said data in response to clocks signals of said first clock domain, and load said shifted data bits into selected bit positions of said register in response to clock signals of said first clock domain.

23. The system of claim 13 wherein said parallel to serial converter includes a plurality of flip-flops, each flip-flop of said converter having an input coupled to an associated bit position of said register of said first clock domain and wherein said parallel to serial converter is further adapted to load bits of data from said register into said plurality of flip-flops in response to clock signals of said second clock domain.

24. The system of claim 23 wherein said converter flip-flops are configured into a plurality of banks, each bank comprising a plurality of said converter flip-flops, and wherein each converter flip-flop of each bank stores an input bit in response to a clock signal of a phase different from the phase of the clock signals for the other converter flip-flops of a particular bank of converter flip-flops.

25. The system of claim 24 wherein said parallel to serial converter is further adapted to shift a loaded bit from one converter flip-flop of a bank to another converter flip-flop of the same bank.

26. The system of claim 18 wherein said integrated circuit is a monolithic integrated circuit memory chip.

27. A device, comprising:
an integrated circuit having a first clock domain in which clock signals have a first period and a second clock domain in which clock signals have a second period in which neither said first period nor said second period is an integral multiple of the other period;
wherein said first clock domain has a first logic circuit which includes a register and a barrel shifter wherein said barrel shifter is adapted to shift bits of data in response to clocks signals of said first clock domain, and load said shifted data bits into selected bit positions of said register in response to clock signals of said first clock domain; and
wherein said second clock domain has a second logic circuit adapted to sample said data at multiple fixed times within each clock signal of said first period.

28. The device of claim 27 wherein said second logic circuit includes a parallel to serial converter adapted to load parallel bits of said data from said first clock domain in response to clock signals of said second clock domain, and convert said parallel bits to serial bits.

29. The device of claim 27 wherein said integrated circuit is a monolithic integrated circuit memory chip.

* * * * *